United States Patent
Garganese

[11] Patent Number: 5,191,172
[45] Date of Patent: Mar. 2, 1993

[54] CABLE TERMINAL PROTECTOR

[76] Inventor: Richard S. Garganese, P.O. Box 323, East Greenwich, R.I. 02818

[21] Appl. No.: 788,807

[22] Filed: Nov. 7, 1991

[51] Int. Cl.$^5$ ............................................. H02G 15/02
[52] U.S. Cl. .............................. 174/74 A; 174/77 R; 174/82; 174/138 F
[58] Field of Search ............. 174/74 A, 74 R, 138 R, 174/138 F, 77 R, 78, 82; 439/369, 464, 468

[56] References Cited

U.S. PATENT DOCUMENTS

| | | | |
|---|---|---|---|
| 3,183,302 | 5/1965 | Wochner et al. | 174/138 F |
| 3,838,213 | 9/1974 | Georgopulos et al. | 174/138 F |
| 3,846,725 | 11/1974 | Mears, Jr. | 174/138 F |
| 3,936,129 | 2/1976 | Guy | 174/138 F |
| 4,169,643 | 10/1979 | Gallagher | 439/369 |
| 4,749,363 | 6/1988 | Luska et al. | 439/369 X |
| 4,943,693 | 7/1990 | Wang et al. | 174/138 F |
| 4,963,700 | 10/1990 | Olsen et al. | 174/138 F |
| 5,017,739 | 5/1991 | Hoffman et al. | 174/138 F |

Primary Examiner—Morris H. Nimmo
Attorney, Agent, or Firm—Barlow & Barlow, Ltd.

[57] ABSTRACT

Cable terminal protector, consisting of two generally rectangular main members joined at one end by an integral live hinge for movement from a face-to-face closed position to an open position, there being a central pocket formed in each main member for forming an enclosure. Cable channels are formed in the ends of the members to clamp a cable when the main members are in the closed position and means are provided for locking the main members in the closed position, while sealing surfaces surround the pockets and to cooperate, when the main members are in the closed position, to prevent foreign matter from entering the enclosure and to provide complete electrostatic encapsulation when a conductive material is used for the protector.

9 Claims, 2 Drawing Sheets

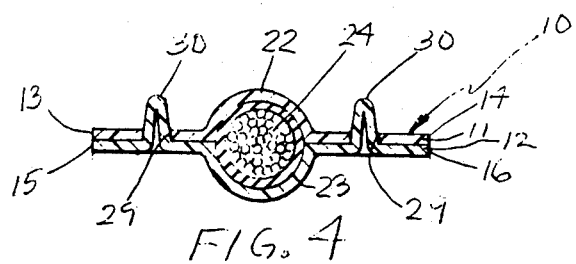
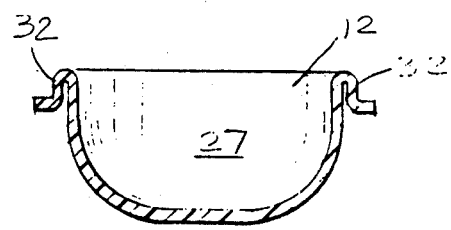
FIG. 4
FIG. 5
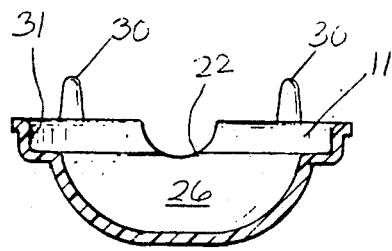
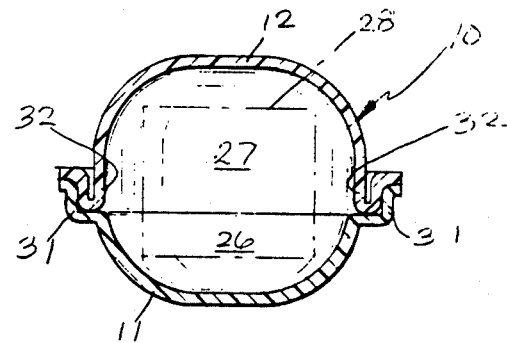
FIG. 6
FIG. 7
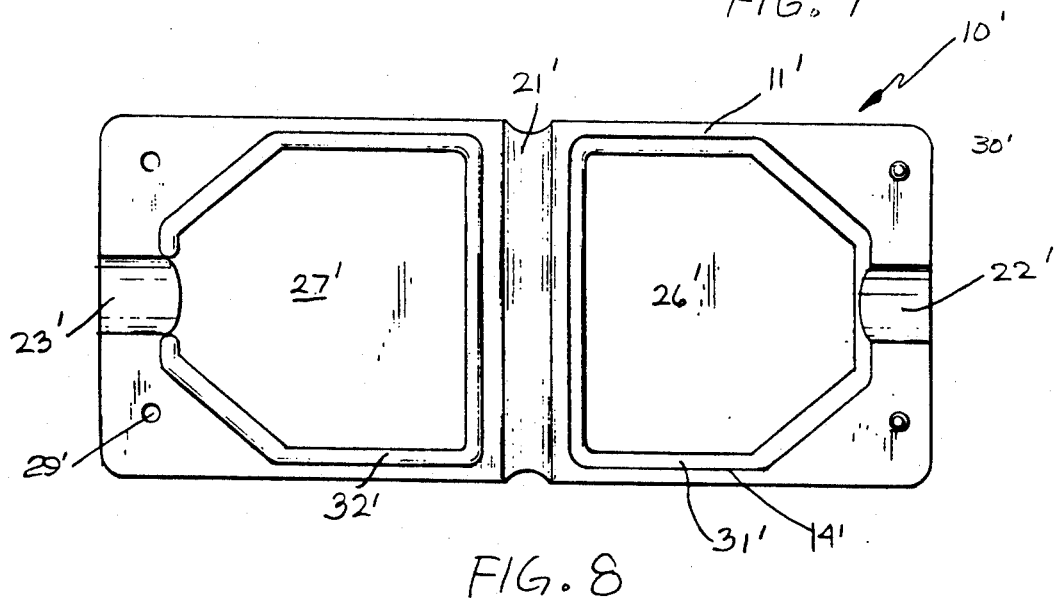
FIG. 8

CABLE TERMINAL PROTECTOR

BACKGROUND OF INVENTION

In the past, cables and more particularly the connectors at the end of cables, have been terminated with covers or caps. The covers are essentially caps which are formed to snap over the end of the cable connectors be they circular, rectangular or of other shapes. In operating systems and particularly systems that are mobile as in vehicles or aircraft, the covers tend to become dislodged and not only does the dirt and other foreign matter then enter the cavity that contains either the male or a female terminal pins or receptacles, but also leaves the cable connector in a position where it is possible to hit other metal objects and cause system difficulties within the electronic system to which the cable might be connected. To meet certain military and critical requirements it has also been common to make the covers out of a conductive material such as a carbon filled plastic or other materials which not only will protect the connector cavity but also will cover the cavity with a conductive material so that a complete electrostatic shield is created. An example of a connector cover is seen in the Guy patent, U.S. Pat. No. 3,936,129. Another example of a connector housing is seen in the Gallagher patent U.S. Pat. No. 4,169,643. In some of these prior art covers, difficulty has been experienced in retaining the two mating members together or positively retained onto the connector.

These and other difficulties experienced with the prior art devices have been obviated in a novel manner by the present invention.

It is, therefore, an outstanding object of the invention to provide complete electrically conductive encapsulation of a cable connector.

Another object of this invention is the provision of a unitary member that has two parts that are positively retained together.

A further object of the present invention is the provision of a portion that will engage the grounded portion of a cable connector.

With these and other objects in view, as will be apparent to those skilled in the art, the invention resides in the combination of parts set forth in the specification and covered by the claims appended hereto.

SUMMARY OF THE INVENTION

To accomplish the foregoing objects, a cable terminal protector is provided for encapsulating and electrically shielding a cable terminal. The protector is in the form of two main members joined by an integral live hinge for movement from an open position to a closed position. Each member has a central pocket and surrounding the pocket are sealing surfaces that cooperate when the main members are in a closed position. The sealing surfaces preferably include a protrusion on one member and a recess on the other so that when the two members are in a closed position, a complete encapsulation results. The main members have provision for locking them together in the closed position ideally by providing a peg of tapered shape that frictionally enters a mating aperture. In this way, the peg forces itself into the aperture and improves the completeness of the mating of the two parts and the sealing of the two together. In one embodiment, the protector is formed to accept a cylindrical connector where the pockets are dished with a radii while in another embodiment, the recesses are formed with a flat bottom wall and an arcuate edge to accept a ribbon and computer type cable connectors.

BRIEF DESCRIPTION OF THE DRAWINGS

The character of the invention, however, may be best understood by reference to one of its structural forms, as illustrated by the accompanying drawings, in which:

FIG. 4 is a sectional view taken on lines 4—4 of FIG. 1;

FIG. 5 is a sectional view taken on lines 5—5 of FIG. 2;

FIG. 6 is a sectional view taken on lines 6—6 of FIG. 2;

FIG. 7 is a sectional view taken on lines 7—7 of FIG. 1; and

FIG. 8 is a plan view similar to FIG. 2 showing an alternate form of recess.

DESCRIPTION OF THE PREFERRED EMBODIMENT

Figure 1:
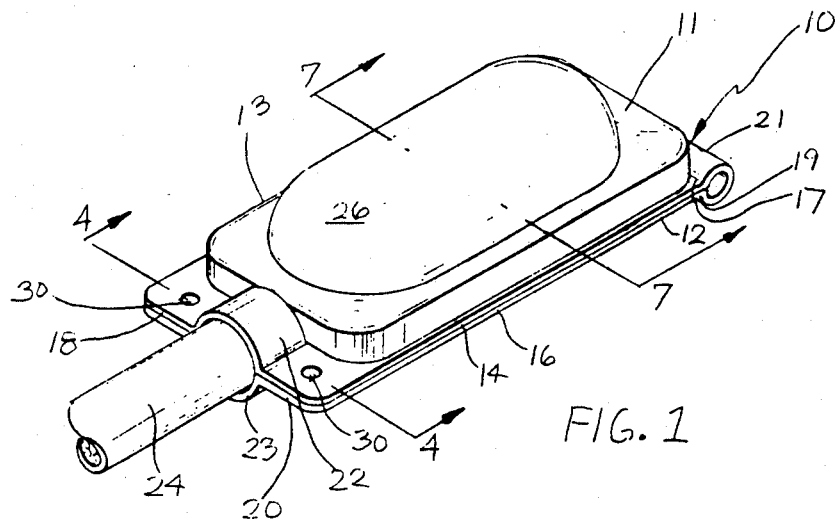
FIG. 1 is a perspective view of one form of a cable terminal protector assembled about a cable with a plug thereon.
Figure 2:
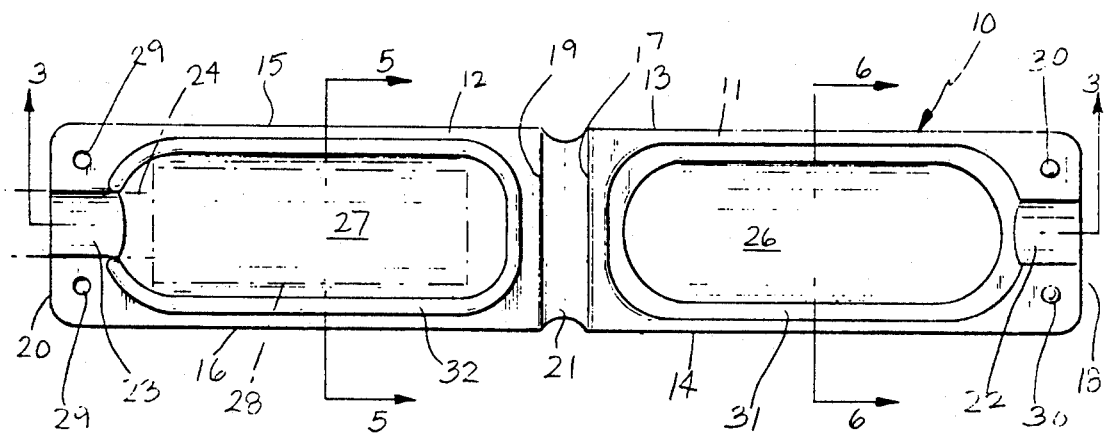
FIG. 2 is a plan view of the terminal protector with the two parts, thereof opened up.

Turning now to the drawings, FIG. 1 shows a connector cover in operative position while FIG. 2 shows the connector cover of semi-rigid plastic in an open position ready to receive a connector. The connector of the type of interest in practicing the invention would be a normal multi-pin circular connector which includes a male or female connector which will be assembled to a cable with a form of cable clamp.

The connector protector generally designated 10 consists of two main members, 11 and 12, of generally rectangular shape having respectively side edges 13, 14 and 15, 16 together with end edges respectively 17, 18 and 19, 20. The two main members 11 and 12 are hinged together along end edges 17 and 19 by integral webs 21 to enable the main members 11 and 12 to be moved hingedly closed to the position shown in FIGS. 1 and 7. The side edges adjacent the end edges 18 and 20 are provided with cable channels 22, 23 so as to embrace a cable 24. The cable channels communicate with pockets or cavities 26, 27 that are configured to accept the type of connector that is being shielded. To this end, if the connector is cylindrical, then the pocket or cavity will be provided with a suitable radius as seen in FIGS. 5 and 6 or may be provided with a different configuration for a flat body connector as seen in FIG. 8. In each instance, for sake of illustration, there is shown in broken lines the connector 28 or 28'.

Figure 3:
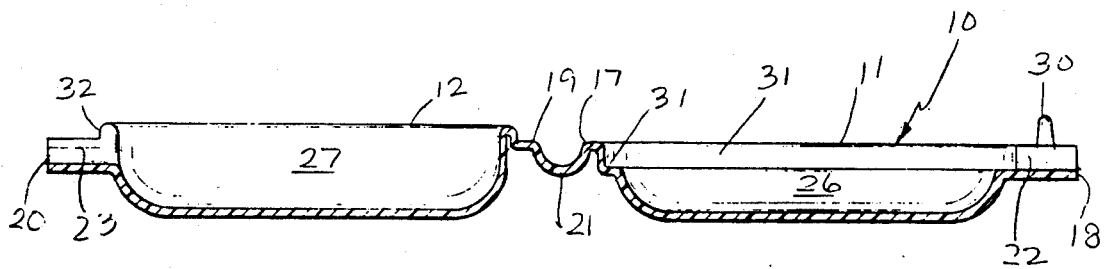
FIG. 3 is a sectional view taken on lines 3—3 of FIG. 2.

Referring to FIGS. 2 and 3, the two main members 11 and 12 are interconnected by a hinge 21 in a unitary one piece construction formed of a flexible electrically conductive plastic material which exhibits a resistivity less than 100,000 ohm-cm. The terminal protector, when the two main members are in a closed position in essentially a face-to-face arrangement where the side edges abut, is uniquely formed with a valley 31 that extends about the cavity 26 which receives when the parts are joined a ridge 32 in the member 12; thus, as seen in FIG. 7, for example, there is provided mating sealing surfaces that surround the pockets 26, 27 to cooperate when the main members 11 and 12 are in a closed position and prevent foreign matter from entering the enclosure and to provide a complete electrostatic encapsulation.

Integral with the side edges and adjacent the end edge 18 are a pair of pegs 30 while on the side edges 15, 16 are a pair of apertures 29. The pegs 30 are tapered to provide a small distal end and provide a semi-conical side wall.

In use, the terminal protector 10, in its open condition as seen in FIGS. 2 and 3, is fitted over the cable 24 and the plug or receptacle 28 or 28' is fitted in the cavity 27, for example, and the other member 11 is brought over the member 12 so that the valley 31 engages the ridge 32 and the pegs 30 will enter the apertures 29 where they are pressed into the apertures 29, deforming the edges of the apertures somewhat. Thus, in the closed position, as seen in detail in FIG. 4, the cable 24 is tightly gripped by the cable channels and the connector 28 is completely encapsulated. The resiliency of the plastic material from which the protector is made ensures a retention of the terminal protector and there also will be provided with properly sized pockets or cavities for the terminal, a contact with a metallic part or shell which is generally at ground or shield potential.

It is significant that the terminal protector can be readily adapted to accommodate not only different diameter cables but also differently sized connectors and may be supplied with variously sized cavities for the connector as well as differently sized cable channels for the cables. FIG. 8 is an example of another configuration, like numerals with a prime indicating similar parts.

From the foregoing, it can be seen that there's been provided an improved cable terminal protector which is a relatively simple and economical construction and which is characterized by the ease of assembly in use and which can be supplied to fit various cable configurations and plugs or receptacles.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Cable terminal protector, comprising
   (a) two rectangular main members, each having spaced, parallel side edges and spaced, parallel end edges,
   (b) a hinge joining one end edge of one of the main members to one of the end edges of the other main member, so that the main members may be moved from an open position to a closed position,
   (c) semi-cylindrical sheaths located at mating edges of the main members to embrace and seal on a cable extending through them in closed position of the main members,
   (d) a pocket extending from the central position of each main member forming an enclosure for a cable terminal,
   (e) apertures formed in one of the main members at the said other end adjacent the intersections of the end edges with the side edges,
   (f) tapered pegs formed on the other of the main members for engagement with the said apertures, and
   (g) inter-engaging seals formed on the main members surrounding the pockets to prevent foreign matter from entering the enclosure.

2. Cable terminal protector as recited in claim 1, wherein the main members, hinge, and pockets are formed as a single integral polymer unit.

3. Cable terminal protector as recited in claim 1, wherein the main members and the hinge are formed from a thin polymer sheet by the vacuum forming an injection molding process.

4. Cable terminal protector as recited in claim 3, wherein the polymer is loaded with conductive material, so that the main members, hinge, sheaths, and pockets can be grounded.

5. Cable terminal protector as recited in claim 3, wherein the interengaging seals consist of a valley formed in one main member and a ridge formed in the other main member, the polymer sheet forming the valley and ridge causing them to be resilient, so that the valley and ridge lock together tightly when the main members are in the closed position.

6. Cable terminal protector as recited in claim 5, wherein each sheath terminates at its inner end at a respective pocket, and wherein each of the valley and ridge extends continuously around its respective pocket, except for a gap where it enters the said inner end of its respective sheath.

7. Cable terminal protector as recited in claim 2, wherein the polymer is carbon-loaded polyethylene.

8. Cable terminal protector, comprising (a) two generally rectangular main member joined at one end by an integral live hinge for movement from a face-to-face closed position to an open position,
   (b) a central pocket formed in each main member for forming an enclosure,
   (c) sheaths formed in the other end and cooperating as a cable clamp when the main members are in the closed position,
   (d) means located at the said other end for locking the main members in the closed position, and
   (e) sealing surfaces surrounding the pockets, said sealing surfaces formed as an interengaging ridge and valley, the ridge of one main member having an inclined slope and the valley on the other main member having an inwardly directed slope, said surfaces cooperating when the main members are in the closed position to prevent foreign matter from entering the enclosure.

9. Cable terminal protector as recited in claim 8, wherein the main members, hinge, pockets, sheaths, and sealing surfaces are formed of a conductive polymer.

* * * * *